United States Patent [19]
Ross

[11] Patent Number: 5,104,201
[45] Date of Patent: Apr. 14, 1992

[54] SHOCK ABSORBING WHEEL HUB

[76] Inventor: Michael G. Ross, 375 Granite Ave., Braintree, Mass. 02184

[21] Appl. No.: 590,021

[22] Filed: Sep. 28, 1990

Related U.S. Application Data

[63] Continuation-in-part of Ser. No. 420,567, Oct. 12, 1989, abandoned.

[51] Int. Cl.⁵ .................... B60B 27/00; B60B 5/02
[52] U.S. Cl. .................... 301/105 B; 152/47; 152/49
[58] Field of Search ........... 301/105 R, 105 B, 124 R; 152/17, 40, 41, 42, 43, 47, 48, 49; 295/11

[56] References Cited

U.S. PATENT DOCUMENTS

| 611,095 | 9/1898 | Ballin | 152/49 |
| 635,575 | 10/1899 | McHugh | 152/49 |
| 857,629 | 6/1907 | Jones | 152/49 |
| 1,651,331 | 11/1927 | Horwitz | 152/48 |

FOREIGN PATENT DOCUMENTS

| 9974 | 3/1956 | Fed. Rep. of Germany | 152/49 |
| 762234 | 4/1934 | France | 152/48 |
| 2461 | 2/1889 | United Kingdom | 152/47 |
| 29276 | 12/1896 | United Kingdom | 152/47 |
| 122795 | 2/1919 | United Kingdom | 152/49 |
| 581845 | 10/1946 | United Kingdom | 152/47 |

*Primary Examiner*—Russell D. Stormer
*Attorney, Agent, or Firm*—M. Lawrence Oliverio

[57] ABSTRACT

Hub apparatus for isolating the frame of a lightweight vehicle from shock imparted to a wheel on which the vehicle is mounted, the hub apparatus comprising an inner annular axle hub to which the frame is directly connected; an outer annular wheel hub surrounding the inner hub and connected directly to the wheel; an intermediate annular resiliently compressible spring engaged against opposing surfaces of the inner and outer hubs and separating the opposing surfaces of the hubs from each other; the intermediate spring being compressible such that shock imparted to the wheel is absorbed by compression of the spring between the opposing surfaces of the hubs.

15 Claims, 6 Drawing Sheets

SHOCK ABSORBING WHEEL HUB

RELATED APPLICATIONS

This is a continuation-in-part of U.S. patent application Ser. No. 420,567 filed Oct. 12, 1989 now abandoned. Priority of this application to the filing date of said parent application is hereby claimed as to any and all subject matter which is expressly and inherently disclosed therein.

BACKGROUND OF THE INVENTION

The present invention relates to wheel hubs for relatively lightweight vehicles and more particularly to a wheel hub assembly which can act to absorb shock.

Shock absorbing devices for use in connection with a variety of moving vehicles such as cars, trucks, bicycles and the like have taken a variety of forms in the past. Conventional shock absorbers typically comprise complex assemblies of mechanical components which are relatively heavy when assembled, occupy a great deal of space on the vehicle when installed, are independent assemblies requiring independent connection to the vehicle and the like. The present invention provides a lightweight shock absorbing assembly incorporated into the wheel hub of a vehicle, most preferably for use in connection with relatively lightweight vehicles such as manually driven cycles, wheelchairs, motorcycles, mopeds, toy vehicles and the like and provides a unique and novel wheel hub shock absorbing assembly over related hub assemblies such as disclosed in U.S. Pat. Nos. 4,535,827 (Seford); 4,405,032 (Welschof et al.); 4,549,590 (Sahagian); German Patent 3,637,214 and European Patent Application No. 85/850320.4.

Additional references such as those of record in the parent application to this application are U.S. Pat. Nos. 1,536,817 (Decker); 2,715,024 (Nydegger et al.); 4,595,242 (Wehmeyer); British Specification No. 581,845 (Wright); British Specification No. 11,582 (Jelly); British Specification No. 11,582 (Kuchen); Italian Patent No. 415,873 (Adami); French Patent No. 2,482,526 (Perrin). These references all disclose hub apparati which are structurally and functionally distinct and deficient relative to the present invention at least in terms of shock absorbence, maintenance of hub alignment, arrangement of components and workability.

SUMMARY OF THE INVENTION

In accordance with the invention there is provided a hub apparatus for isolating the frame of a lightweight vehicle (typically less than about 100 pounds) from shock imparted to a wheel on which the vehicle is mounted, the hub apparatus comprising an inner annular axle hub to which the frame is directly connected; an outer annular wheel hub concentrically surrounding the inner hub and connected directly to the wheel; an intermediate annular resiliently compressible spring engaged or otherwise biased continuously against the circumferences of or otherwise continuously around the outer and inner opposing surfaces of the inner and outer hubs respectively and separating the opposing surfaces of the hubs from each other; the intermediate spring being compressible such that shock imparted to the wheel is absorbed by compression of the spring between the opposing surfaces of the hubs.

The inner and outer wheel hubs preferably comprise a lightweight material selected from the group of aluminum, chromium, steel, magnesium, titanium, rigid impact resistant plastic and mixtures of the foregoing. One of the inner and outer hubs most preferably includes a mechanism for seating the other hub against longitudinal movement relative to the one hub.

The seating mechanism typically comprises a flange extending outwardly from the ends of one of the hubs, the flange having a pair of opposing inside surfaces defining a cavity between the hubs in which the other hub is received and maintained in longitudinal alignment with the one hub, the spring being sandwiched between the inner hub and the outer hub within the cavity. Most preferably the apparatus includes a washer mechanism sandwiched between and engaging the inside surfaces of the flanges and the outer end surfaces of the hub which is received within the cavity, the washer comprising a highly abrasion resistant material.

The outer hub typically includes a mechanism protruding from the outer surface of the hub for receiving and aligning spokes connected at one end to the means for receiving and at the other end to the wheel of the vehicle.

The spring preferably comprises a polyurethane material having a durometer hardness of between about 40 and about 60 Shore A.

DETAILED DESCRIPTION OF THE INVENTION

The following description sets forth certain embodiments of the invention for purposes of explanation.

Figure 1:
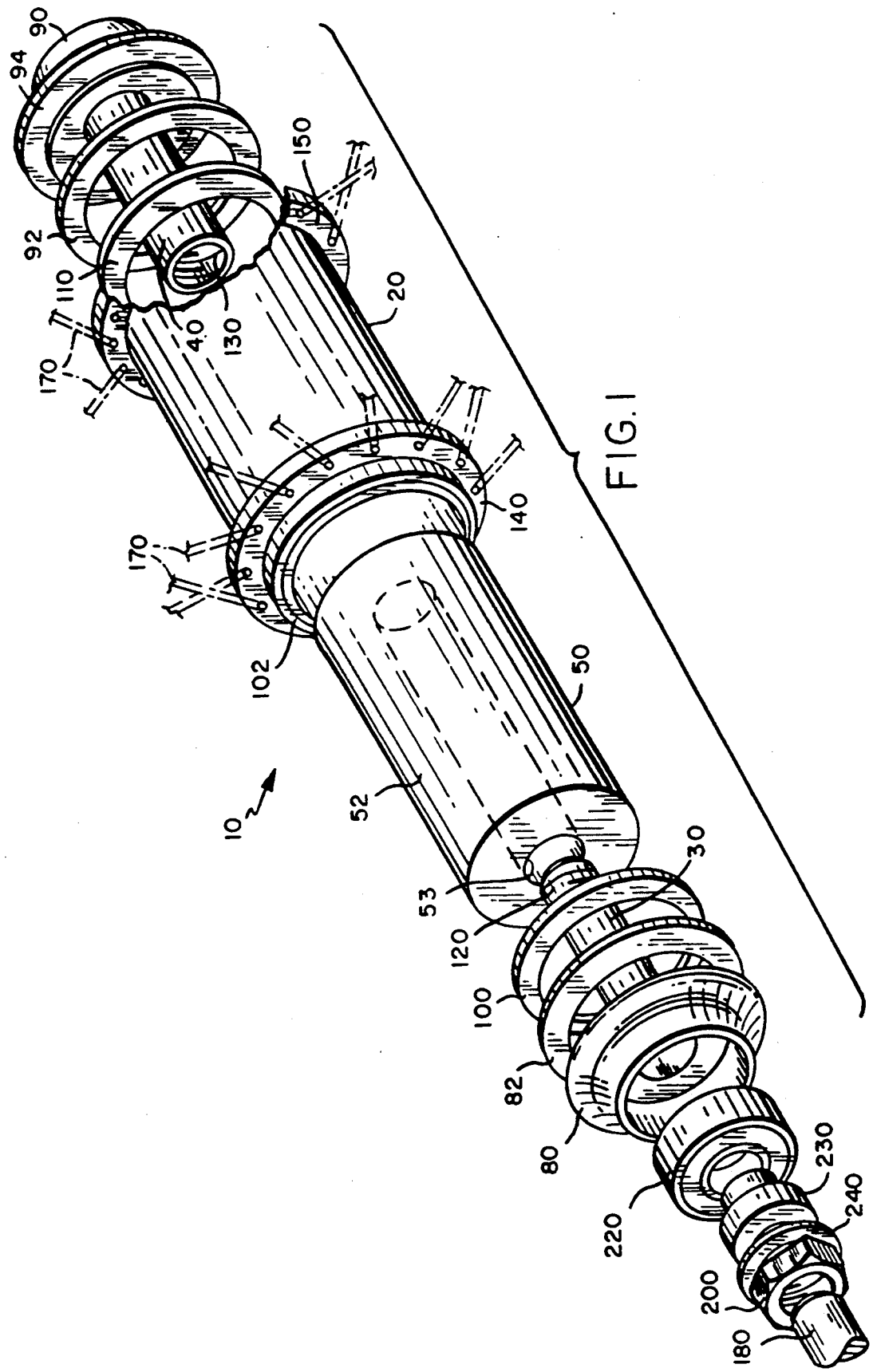
FIG. 1 is an exploded isometric view of a shock absorbing wheel hub apparatus according to the invention.

There is shown in exploded view in FIG. 1 a wheel hub assembly 10 according to the invention. The assembly 10 comprises an outer wheel hub 20, an inner axle hub 30, 40 and an intermediate spring 50. As shown in cross-section in FIG. 2, the outer hub 20 concentrically surrounds the inner hub 30, 40 when assembled with the spring 50 being sandwiched therebetween.

As shown in one typical embodiment, the outer 20 and inner hubs 30, 40 are cylindrical having inner 25 and outer 35 surfaces which oppose each other when assembled with the spring 50 intimately and continuously engaged against both opposing surfaces 25, 35 all the way around the inside and outside circumferences of the hubs 20, 30, 40. For purposes of alternative embodiment illustration, the outer hub 20 is shown in dashed lines 27, FIG. 2, as being contoured in a bowl-shaped manner as an alternative to a simple cylindrical contour. Such a bowl-shaped configuration might be preferred insofar as in a bicycle application, such a contour is more customary with respect to wheel hubs. In any event, whatever specific contour for the outer 20 or inner 30, 40 hub is selected, the outer hub 20 would have an inner surface, such as 29 in the case of contour 27, which opposes the outer surface 35 of inner hub 30, 40.

Figure 2:
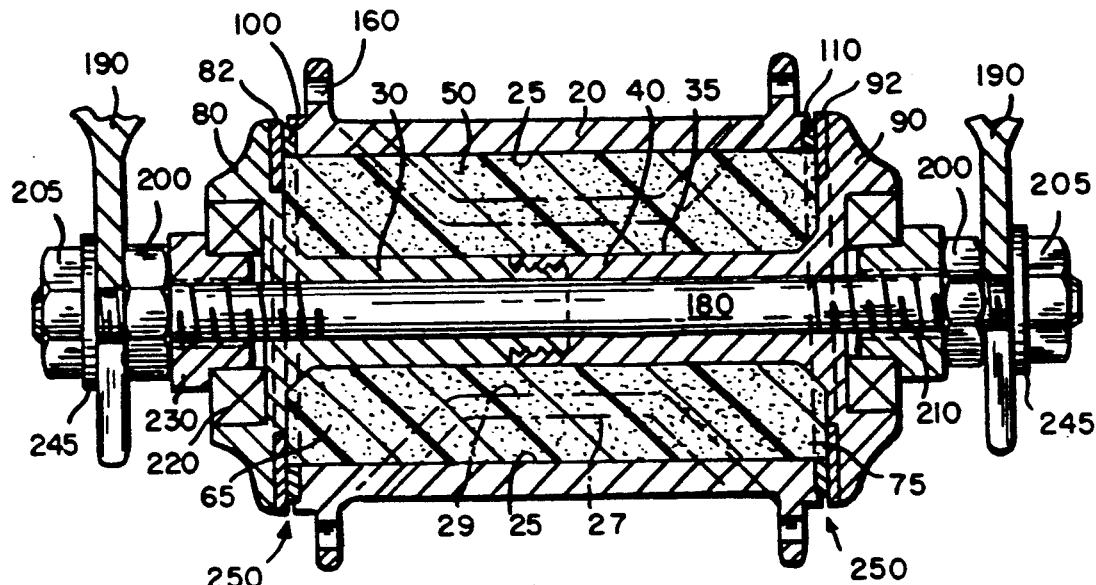
FIG. 2 is an axial cross-sectional view of the FIG. 1 apparatus when assembled.
Figure 3:
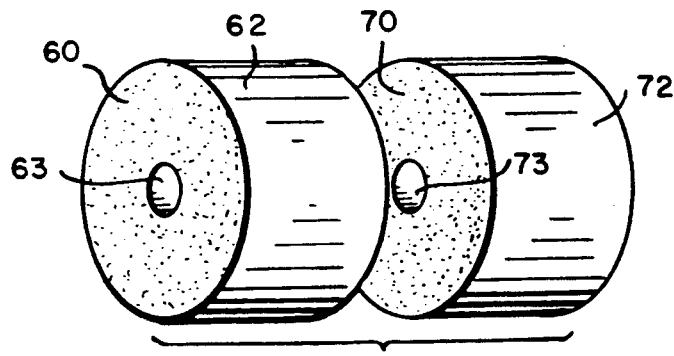
FIG. 3 is a side isometric view of one alternative embodiment of a spring mechanism component for use in a shock absorbing wheel hub according to the invention.

As shown in FIG. 3, the spring mechanism may alternatively comprise a pair of spring elements 60, 70 which are disposed at separate locations along the axes of hubs 20, 30, 40, e.g. at the outer lateral ends 65, 75, FIG. 2, of the hubs 20, 30, 40. In any event, a spring mechanism such as 50, 60, 70 preferably engages an inside surface of the outer hub 20 and an outside surface of the inner hub 30, 40 continuously around the circumference of opposing hub surfaces such as 25 and 35. Although there may be situations where the spring mechanism does not necessarily engage the entire inside 25 and outside 35 surfaces along the entire axial length of the hubs 20, 30, 40 such as in an embodiment where separate springs 60, 70 are employed, the spring mechanism should preferably engage or otherwise be biased against (when under compression from shock) opposing surfaces of the hubs continuously all the way around the axis of the concentric hubs. Such continuous biasing or engagement all the way around the opposing surfaces, provides particular stability against shock, ensures that the spring will not be subject to an overly localized pressure and thus be more readily capable of distributing absorption of shock throughout the spring mechanism.

Figure 4:
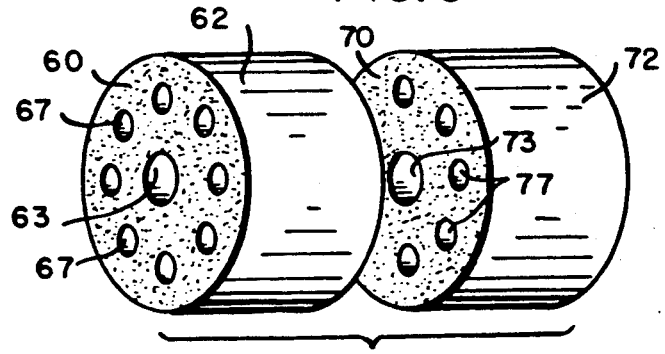
FIG. 4 is a side isometric view of another alternative embodiment of a spring mechanism component for use in a shock absorbing wheel hub according to the invention.

Preferably the spring mechanism(s) 50 or 60, 70 comprises a body of resiliently compressible elastomeric material such as a thermoplastic elastomer such as a thermoplastic polyurethane, styrene/butadiene block copolymers, styrene/ethylene butylene block copolymers, polyolefins, thermoplastic vulcanizates, block copolymers of polyether and polyesters, block copolymers of polyether and polyamide, ionic polymers and alloys of plastic and rubber or elastomer. Mixtures or alloys of two or more of all of the foregoing may, depending on the desired degree of resiliency and compressibility of the spring, also be suitable. As shown in FIGS. 1, 3, 4, the preferred spring 50, 60, 70 embodiments have outer circumferential surfaces 52, 62, 72 and inner circumferential surfaces 53, 63, 73 for engaging surfaces 25, 35 continuously all the way around the axes of the hubs.

As shown in FIGS. 1, 2, the hubs 20, 30, 40 are not directly connected to each other but rather are seated together such that the axes of the hubs 20, 30, 40 can move freely toward and away from each other subject to being biased apart by the spring 50. As can be seen, the seating arrangement does not allow the hubs 20, 30, 40 to move longitudinally (axially) relative to each other. As shown in the embodiments in FIGS. 1, 2, the seating mechanism comprises flange-like mechanisms 80, 90 in the nature of the head of a bolt protruding from the ends of inner hub 30, 40 perpendicularly to the axis of the hub 30, 40. In a preferred embodiment outer washers 82, 92 are seated within complementary recesses such as 94, FIG. 1, on the inside faces of flanges 80, 90. Most preferably, second washers 100, 110 are seated within complementary recesses such as 102 on the outside or lateral end surfaces of hub 20. As shown, the outer hub 20 seats snugly between the flanges 80, 90 such that the hub 20 cannot move axially relative to hub 30, 40.

As shown in FIG. 2, the flanges 80, 90 protrude perpendicularly relative to the axis of the hubs 20, 30, 40 past the level where the inside circumferential edge 25 of hub 20 extends. The hub 20 is thus seated between the flanges 80, 90 and cannot move longitudinally relative to hub 30, 40 once the apparatus 10 is assembled. As shown in FIGS. 1, 2, the inside circumferential edge 25 of hub 20 is maintained a selected spaced distance away from the axis of hub 30, 40 by virtue of the spring 50.

As shown in FIGS. 1, 2, the inner hub may comprise a two component 30, 40 assembly (for purposes of ease of assembly) which may be screwably connected by providing complementary male 120 and female 130 threaded components shown in assembled form in FIG. 2.

The outer hub 20 typically includes lateral protrusions 140, 150 having a series of apertures 160 therearound through which spokes 170 are connected. The spokes 170 are connected at their opposite ends to a wheel (not shown) of a vehicle, it being understood that the outer hub 20 may alternatively be connected to a vehicle wheel in any of a variety of conventional ways apart from protrusions 140, 150, apertures 160 and spokes 170.

A central axle bolt 180 extends through a complementary axial aperture through hub 30, 40 and the frame of the vehicle is directly connected to the axle bolt 180 as shown via arms 190 which are connected to the ends of the axle bolt 180 by conventional means such as nut 200, nut 205 (not shown in FIG. 1), and bolt 210 means, FIGS. 1, 2. In a bicycle application, for example, other conventional components such as ball bearing 220, ca 230 and washer 240 and/or 245 mechanisms are typically provided. In a typical cycle application nut 205 and washer 245 might typically be replaced with a conventional quick release fitting.

By virtue of the lack of direct interconnection between hub 20 and hub 30, 40, when shock is encountered by a wheel, the shock is initially directly imparted to the outer hub 20 through spokes 170 and not directly to inner hub 30, 40. That is, inner hub 30, 40 (and thus, the frame of the vehicle to which axle bolt 180 is directly connected) is insulated from direct shock experienced by the wheel of the vehicle by virtue of the essential suspension of outer hub 20 on spring 50. As can be readily imagined, when shock is imparted to hub 20, spring 50 compresses and thus absorbs some, if not all, of the shock, and, after compression, the spring 50 resiliently resumes its former shape.

The combination of flange 80, washer 82, and washer 100, form a bearing race between inner hub 30 and outer hub 20. The combination of flange 90, washer 92, and washer 110 form a bearing race between inner hub 40 and outer hub 20. The bearing races hold outer hub 20 in proper lateral relationship to inner hubs 30, 40. The bearing races eliminate lateral or axial motion between inner hubs 30, 40 and outer hub 20. Thus, motion between outer hub 20 and inner hubs 30, 40 is restricted to radial movement such that inner hubs 30, 40 and outer hub 20 always remain in a parallel lateral relationship.

The degree of compressibility and resiliency of spring 50 may be pre-selected to be peculiarly compatible with the particular weight of any given vehicle, the degree of shock to be absorbed and the like. The degree of compressibility and resiliency is typically pre-selected by pre-selecting one or more of the material out of which spring 50 is comprised and the size, shape or configuration of the spring 50. For example, where the spring 50 is preferably selected to comprise a solid body of elastomeric material, the particular elastomeric material and the durometer hardness thereof are typically selected to achieve a desired compressibility and resilience. Similarly, in an embodiment such as shown in FIGS. 1, 2 where an elastomeric body is employed, the thickness, diameter, porosity, cell structure and the like of the body may be varied to achieve a particular desired degree of compressibility and resilience. As shown in FIG. 3, the degree of shock absorbence of an elastomeric body of material may be varied relative to a solid body such as 50, FIGS. 1, 2, by providing separate smaller bodies 60, 70 of selected length, diameter and the like. As shown in FIG. 4, a selected configuration for an elastomeric body(ies) 60, 70 may be provided with a selected degree of shock absorbence by, for example, drilling one or more apertures therethrough such as axially oriented apertures 67, 77.

The material of which hubs 20, 30, 40 are comprised are typically relatively lightweight such as aluminum, titanium, magnesium, high impact plastic and are thus typically not as abrasion resistant as other more dense abrasion resistant materials such as stainless steel. It is advantageous, therefore, to minimize the degree to which any of the surfaces of the hubs 20, 30, 40 may slide against each other or otherwise make contact. Washers 82, 92, 100, 110 are thus preferably provided such that when the hubs 20, 30, 40 move under shock relative to each other, the opposing washers 82, 100 and 92, 110 bear the abrasion forces due to hub movement. As shown in FIG. 2, the outer portions of the recess(es) in which washers 100, 110 are disposed are themselves recessed inwardly preferably leaving a gap 250 between the outside lateral surface of hub 20 and washers 82, 92 such that when hub 20 moves its outside lateral surface does not contact washers 82, 92 thus better preserving the structural integrity of such surfaces against wear due to abrasion. The washers 82, 92, 100, 110 are preferably comprised of a relatively highly abrasion resistant material such as stainless steel and may be readily replaced by virtue of the readily assemblable/disassemble nature of the hub assembly 10.

The apparatus 10 is particularly suitable for use in relatively lightweight vehicle applications and thus the choice of relatively lightweight materials to comprise the hubs 20, 30, 40 and spring 50 (60, 70) will in many applications be preferred. The application of the apparatus to lightweight vehicles (typically less than about 100 pounds) is particularly preferred insofar as elastomeric materials having a compressibility and resilience suitable for effective shock absorbence under relatively lightweight conditions are readily available at reasonable cost. In cycle applications where a hub according to the invention is employed as the front hub of a cycle such as a bicycle, it has been found that a polyurethane material having a durometer hardness of between about 40 and about 60 Shore A is particularly suitable for use as a spring 50 (60, 70) body. Where a body of elastomer is selected for use as the spring element of the invention, the durometer hardness of the elastomer may range between about 40 Shore A and about 70 Shore D or, in flexural moduli, from about or less than about 1000 to about or over about 300,000 p.s.i., the specific hardness/flexural moduli of the elastomer to be selected depending on a variety of factors such as the weight of the vehicle, the size, shape, configuration of the hub(s) and the size, shape, configuration of the elastomer body(ies).

Figure 5:
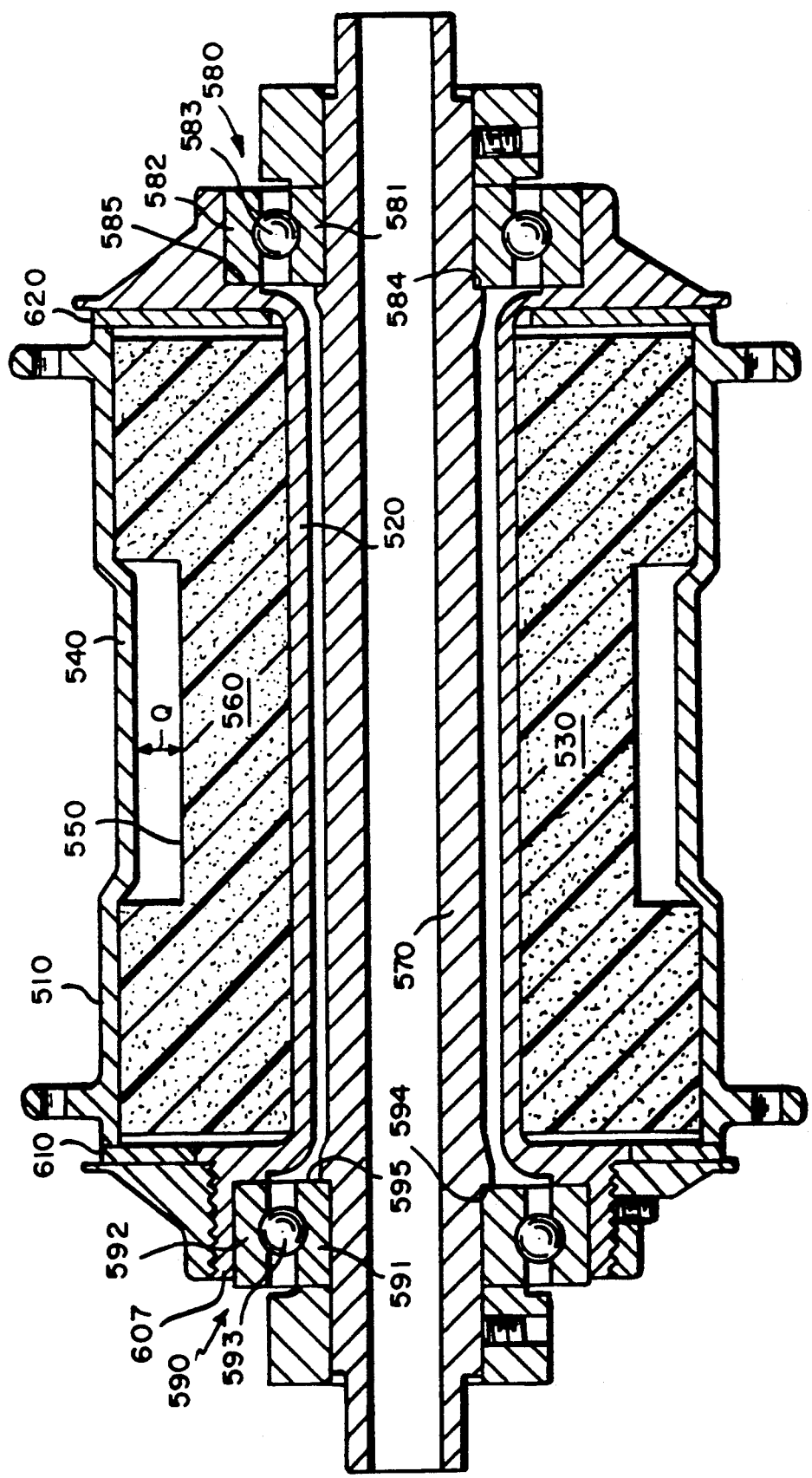
FIG. 5 is a longitudinal cross-sectional view of another embodiment of the invention.

FIG. 5 shows an alternative embodiment of the invention wherein the apparatus 500 comprises an outer hub 510 and inner hub 520 sandwiching an intermediate compressible rubber spring 530 in which a portion 550 of the outside surface of the spring 530 is spaced a selected distance Q away from engagement with an opposing surface 540 of the hub 510. In such an embodiment the compressibility of the spring 530 material may be selected relative to the depth Q and the size (length) of the groove 550 in the spring 530 such that when shock is imparted to the outer hub 510 causing compression of the spring 530, the spring portions which are engaging the opposing surfaces of the hubs 510, 520 may compress up to the point where the surface 540 engages the surface 550 at which point the spring 530 will not compress further due to the ultimate engagement of surfaces 540 and 550 and the necessity for further compression of portion 560 of spring 530.

A polyurethane material, typically comprising a mixture of high and low density polyurethane and having a durometer hardness of between about 40 and about 60 Shore A is preferred as a material of which spring 530 may be comprised. Other suitable compressible rubbers may be employed such as polychloroprene having a durometer hardness of between about 65 and about 85 Shore A.

Figure 6:
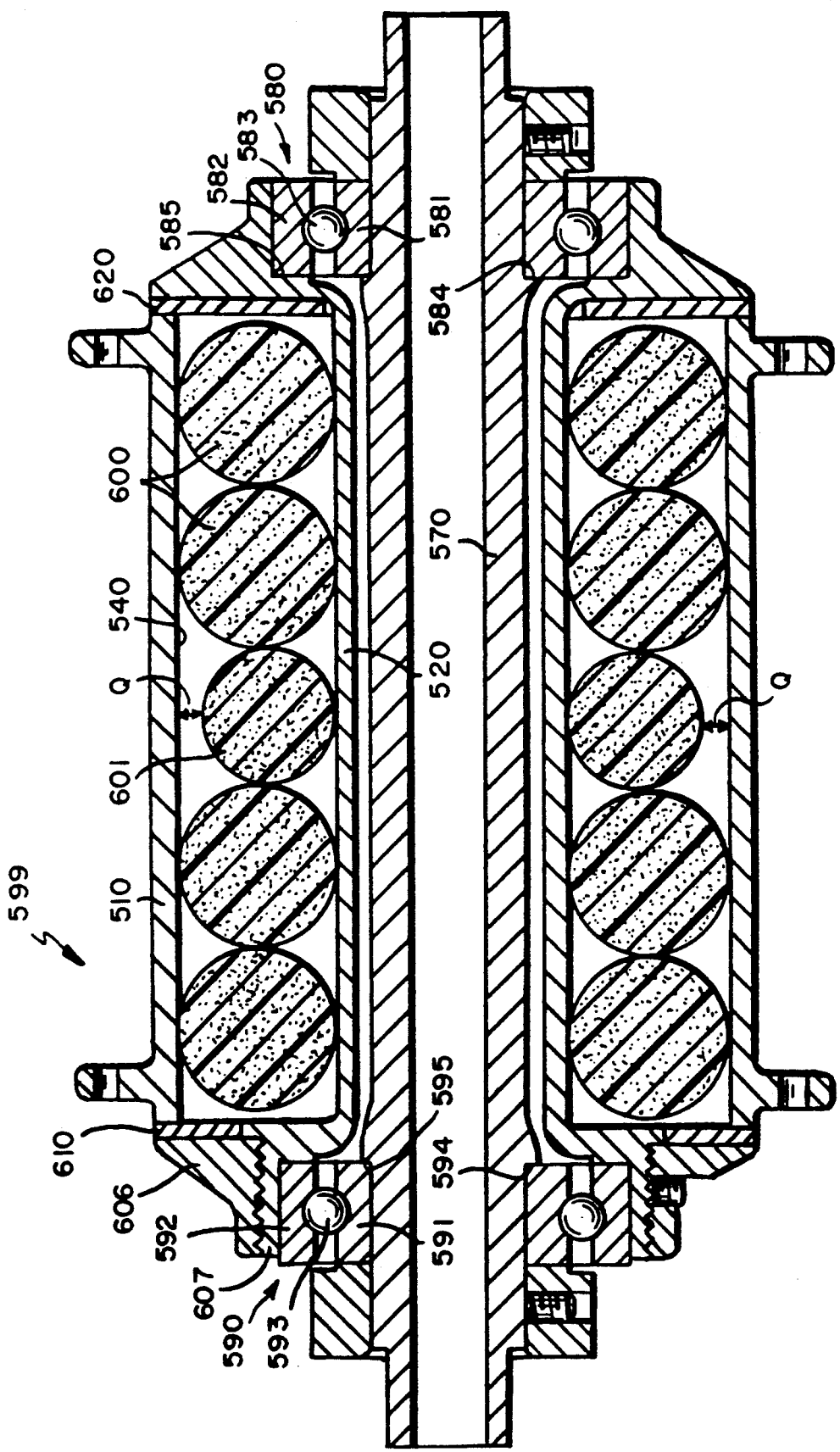
FIG. 6 is a longitudinal cross-sectional view of another embodiment of the invention.

As shown in FIG. 6, the spring 530 may alternatively comprise a series of compressible rings 600, 601 where a selected ring 601 is preferably disposed in the center of the length of the hubs 510, 520 and is spaced a distance Q away from the opposing hub 510 as opposed to other rings 600 which engage opposing surfaces of both hubs 510, 520. The compressibility of the rings 600, 601 and the spacing Q is selected to accomplish the same limiting in compression of the overall spring as described above with reference to spring 530.

In a preferred embodiment of the structure illustrated in FIG. 6, ring 601 is composed of a material having a harder durometer than rings 600. For example, in a preferred embodiment, ring 601 is composed of a material such as polyurethane and has a durometer hardness of between about 70 and about 90 Shore A while rings 600 is composed of a material such as polychloroprene. Rings 600, 601 may be thought of as forming a variable rate spring. When shock is imparted to the outer hub 510, rings 600 may compress up to the point where the surface 540 engages the surface 602 of ring 601. Thereafter, ring 601 will not compress further unless the shock imparted to the outer hub 510 is of sufficient magnitude to compress the harder durometer ring 601. Thus, it will be seen that relatively mild shocks will be fully absorbed by rings 600, while shocks of a relatively larger magnitude imparted to the outer hub 510 will fully compress rings 600 and act against ring 601. The construction in FIG. 6 thus provides for a dual-rate spring.

As shown in FIGS. 5, 6 the inner hub 520 receives an axle 570 which is unitary in structure. The axle 570 is coaxially rotatably mounted within hub 520 by ball bearing mechanisms 580, 590. An inner independent ring component 581, 591 of each bearing 580, 590 is typically press fitted or otherwise fixed to the circumference of the axle 570 and an outer independent ring component 582, 592 is press fitted or otherwise fixed within or to a complementary recess surface provided on the hub 520. The components 581, 582 and 591, 592 rotate around each other on balls 583, 593 thus enabling axle 570 and hub 520 to similarly coaxially rotate relative to each other.

As shown in FIGS. 5, 6, the inner hub 520 is provided with a male-threaded portion 607. Bearing cap 606 having a female-threaded portion is also provided. During assembly, bearing cap 606 is threaded onto portion 607 to hold washers 610, 620 and outer hub 510 in proper lateral relationship. Washers 610, 620 located between inner hub 520 and outer hub 540 form a bearing race that eliminates lateral or axial motion of hub 510 relative to hub 520. Motion between hub 510 and hub 520 is restricted to radial motion. The bearing races illustrated in FIGS. 5, 6 operate in a manner analogous to the bearing races illustrated in the embodiment of FIGS. 1, 2.

A pair of steps 584, 594 are provided on the outside surface of axle 570. The components 581, 591 are seated flush against the steps 584, 594. The steps are spaced apart from each other to an extent necessary to at least provide a gap 585, 595 between the inside surface of components 581, 591 and any opposing surface of the hub 520 such that the components 581, 582 and 591, 592 cannot be prevented from rotating relative to each other, such as by incidental frictional engagement of a surface of components 581 or 582 with an opposing surface of hub 520.

As described above with reference to FIGS. 1-2, the outer hub 510 is rigidly seated against longitudinal or skew movement within inner hub 520 via suitable washers 610, 620 such that upon compression of the spring 530, the hubs 510, 520 remain substantially in coaxial alignment with each other at all times, the wheel of the vehicle thus also remaining in substantially coaxial alignment with the axle 570 at all times.

Figure 7:
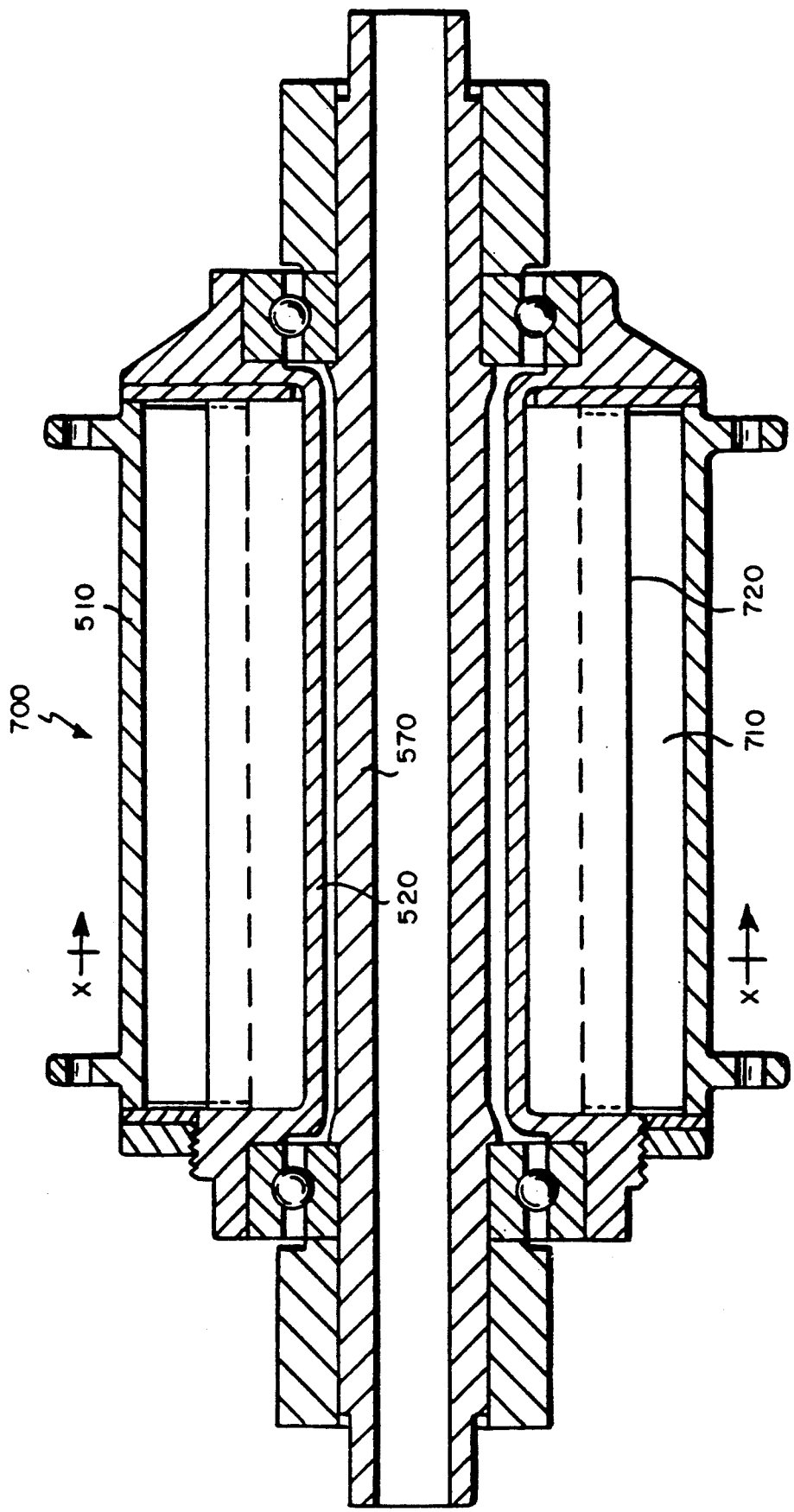
FIG. 7 is a longitudinal cross-sectional view of another embodiment of the invention.
Figure 8:
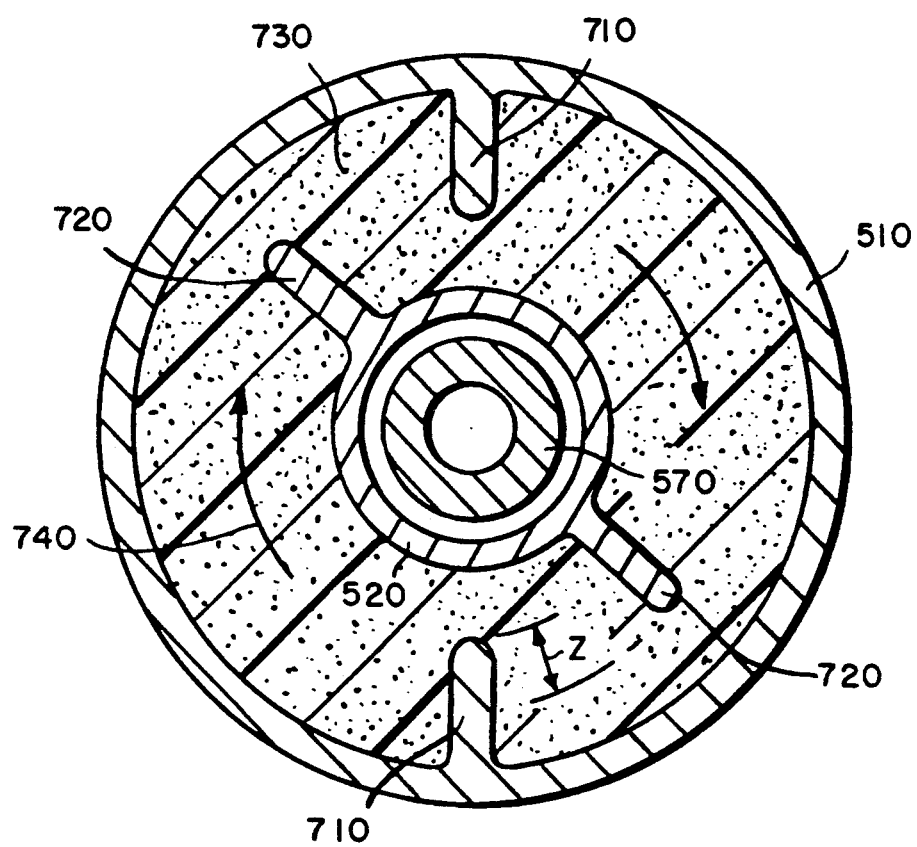
FIG. 8 is an axial cross-sectional view of the embodiment shown in FIG. 7.

The apparatus 700 shown in FIG. 7 may be essentially identical to the apparati shown in FIGS. 5, 6 except as described below and similarly depicted components are not specifically described. FIG. 8 shows an axial cross-section of apparatus 700 along lines X—X. As shown fins 710 and 720 project radially from the outer 510 and inner 520 hubs respectively. The fins 710 and 720 are shown as flat protrusions integral with the hubs 510, 520 projecting into the body of compressible rubber spring material 730 such that the inner hub 520 is prevented from coaxially rotating relative to the outer hub 510, for example when the wheel attached to the outer hub 510 is braked or the inner hub 520 is driven such as in a rear wheel hub driven bicycle.

Most preferably, the fins 710, 720 project far enough into the spring material 730 to have an extension overlap Z such that any rotation action of one hub relative to another causes the fins 710, 720 to compress the spring material between the faces of the fins 710, 720 and thus force the hubs 510, 520 to rotate together. The fins 710, 720 do not necessarily have to extend so far as to overlap but the same is preferred.

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

What is claimed is:

1. Hub apparatus for isolating the frame of a lightweight vehicle from shock imparted to a wheel on which the vehicle is mounted, the hub apparatus comprising:
   an inner annular axle hub to which the frame is directly connected;
   an outer annular wheel hub surrounding the inner hub and connected directly to the wheel;
   an intermediate annular resiliently compressible spring means engaged against opposing surfaces of the inner and outer hubs and separating the opposing surfaces of the hubs from each other, the annular spring means being substantially uncompressed in the absence of radial force being applied between the hubs;
   a portion of the intermediate annular spring being spaced a distance away from an opposing hub surface, the spacing being selected to allow the opposing hub surface to compress engaged portions of the spring and absorb shock imparted to the wheel up to a point where the opposing hub surface engages the spaced portion of the spring during compression, whereby travel for the opposing hub is limited by the distance between the opposing hub and the spaced portion of the spring.

2. The apparatus of claim 1 wherein the inner and outer wheel hubs comprise a lightweight material selected from the group of aluminum, chromium, steel, magnesium, titanium, rigid impact resistant plastic and mixtures of the foregoing.

3. The apparatus of claim 1 wherein one of the hubs includes flange means forming a cavity within which the other hub is seated, the other hub being seated within the cavity between the flange means such that travel between the hubs is restricted only by the annular spring means.

4. The apparatus of claim 1 wherein the spring means comprises a resiliently compressible elastomeric material.

5. The apparatus of claim 4 wherein the compressible material is selected from the group of polyurethane and polychloroprene.

6. The apparatus of claim 5 wherein the compressible material comprises polyurethane having a durometer hardness between about 40 and about 60 Shore A.

7. The apparatus of claim 5 wherein the compressible material comprises polychloroprene having a durometer hardness between about 65 and about 85 Shore A.

8. Hub apparatus for isolating the frame of a lightweight vehicle from shock imparted to a wheel on which the vehicle is mounted, the hub apparatus comprising:
   an inner annular axle hub to which the frame is directly connected;
   an outer annular wheel hub surrounding the inner hub and connected directly to the wheel;
   an intermediate annular resiliently compressible spring means engaged against opposing surfaces of the inner and outer hubs for absorbing shock imparted to the wheel;
   the inner hub receiving an axle, the axle and the inner hub being coaxially rotatable relative to each other by means of a pair of ball bearing means each having a pair of independent rotatable components surrounding balls and forming a cartridge, each of the pair of independently rotatable components being independently fittably engaged as a cartridge with surfaces of the axle and the inner hub respectively on left and right ends thereof, each of the pair of independently rotatable components of each of the pair of ball bearings being spaced a distance away from each other by stop means on the axle to prevent the independent bearing components fitted on the axles from engaging a surface of the inner hub, the independent components being fittably engaged with the surfaces of the axle and the inner hub without engagement with a variable fitting mechanism.

9. Hub apparatus for isolating the frame of a lightweight vehicle from shock imparted to a wheel on which the vehicle is mounted, the hub apparatus comprising:
an inner annular axle hub to which the frame is directly connected;
an outer annular wheel hub surrounding the inner hub and connected directly to the wheel;
an intermediate annular resiliently compressible spring means engaged against opposing surfaces of the inner and outer hubs, the spring means comprising a solid compressible body of polymeric material;
the opposing surfaces of the hubs having fins extending radially from the hubs in opposing directions into the solid body a distance sufficient to overlap in radial extension such that the compressible body between the overlap in radial extension of the fins may be compressed to allow for braking or driving connection between the hubs.

10. Hub apparatus for isolating the frame of a lightweight vehicle from shock imparted to a wheel on which the vehicle is mounted, the hub apparatus comprising:
an inner annular axle hub to which the frame is directly connected;
an outer annular wheel hub surrounding the inner hub and connected directly to the wheel;
an intermediate annular resiliently compressible spring means engaged against opposing surfaces of the inner and outer hubs and separating the opposing surfaces of the hubs from each other;
wherein one of the hubs includes flange means forming a cavity within which the other hub is seated, the other hub being seated within the cavity between the flange means such that travel between the hubs is restricted only by the annular spring means, the spring means being substantially uncompressed in the absence of radial force applied between the hubs.

11. The hub apparatus of claim 10 wherein a portion of the annular spring means is spaced a distance away from an opposing hub surface, the spacing being selected to allow the opposing hub surface to compress engaged portions of the spring means and absorb shock imparted to the wheel up to a point where the opposing hub surface engages the spaced portion of the spring means during compression whereby the travel for the opposing hub is limited by the distance between the opposing hub and the spaced portion of the spring means.

12. The apparatus of claim 10 wherein the other hub which is seated within the cavity has left and right end surfaces seated between the flanges, the apparatus further comprising washer means sandwiched between the flange means and the end surfaces of the other hub, the washer means comprising a highly abrasion resistant material separating the end surfaces of the other hub from abrasion contact with the flange means and seating the other hub against longitudinal or skew movement relative to the one hub.

13. Hub apparatus for isolating the frame of a lightweight vehicle from shock imparted to a wheel on which the vehicle is mounted, the hub apparatus comprising:
an inner annular axle hub to which the frame is directly connected;
an outer annular wheel hub surrounding the inner hub and connected directly to the wheel;
an intermediate annular resiliently compressible spring means engaged against opposing surfaces of the inner and outer hubs and separating the opposing surfaces of the hubs from each other;
wherein one of the hubs includes flange means forming a cavity within which the other hub is seated, the other hub having left and right end surfaces seated between the flanges, the apparatus further comprising washer means sandwiched between the flange means and the end surfaces of the other hub, the washer means comprising a highly abrasion resistant material separating the end surfaces of the other hub from abrasion contact with the flange means and seating the other hub against longitudinal or skew movement relative to the one hub.

14. The apparatus of claim 13 wherein the other hub is seated within the cavity between the flange means such that travel between the hubs is restricted only by the annular spring means, the spring means being substantially uncompressed in the absence of radial force being applied between the hubs.

15. The apparatus of claim 13 wherein a portion of the annular spring means is spaced a distance away from an opposing hub surface, the spacing being selected to allow the opposing hub surface to compress engaged portions of the spring means and absorb shock imparted to the wheel up to a point where the opposing hub surface engages the spaced portion of the spring means during compression whereby travel for the opposing hub is limited by the distance between the opposing hub and the spaced portion of the spring means.

* * * * *